United States Patent [19]

Ihrke et al.

[11] Patent Number: 5,029,930

[45] Date of Patent: Jul. 9, 1991

[54] ADJUSTABLE DECK LID HINGE PIVOT

[75] Inventors: Randy K. Ihrke, Auburn Hills; Britt A. Beatty, Holland, both of Mich.

[73] Assignee: General Motors Corporation, Detroit, Mich.

[21] Appl. No.: 577,169

[22] Filed: Sep. 4, 1990

[51] Int. Cl.[5] ........................ B62D 25/10; E05D 7/04

[52] U.S. Cl. ........................................ 296/76; 16/235; 16/245

[58] Field of Search .................... 296/76, 146; 16/235, 16/245, 246, 361

[56] References Cited

U.S. PATENT DOCUMENTS

| | | | |
|---|---|---|---|
| 2,120,685 | 6/1938 | Soss et al. | 16/288 |
| 2,583,950 | 1/1952 | Kirschner | 16/238 |
| 2,591,979 | 4/1952 | Turley | 49/400 |
| 2,786,228 | 3/1957 | Deaton et al. | 16/246 |
| 3,152,355 | 10/1964 | Ferguson | 16/238 |
| 3,584,332 | 6/1971 | Taylor | 16/245 |
| 4,124,954 | 11/1978 | Redick | 49/236 |
| 4,186,476 | 2/1980 | Mair et al. | 29/407 |
| 4,590,642 | 5/1986 | Hesener | 16/245 |
| 4,646,472 | 3/1987 | Sugawara | 49/386 |
| 4,776,626 | 10/1988 | Seyler | 296/76 |
| 4,893,863 | 1/1990 | Skonieczny et al. | 296/76 |

FOREIGN PATENT DOCUMENTS

| | | | |
|---|---|---|---|
| 208085 | 1/1987 | European Pat. Off. | 16/235 |
| 2722758 | 11/1978 | Fed. Rep. of Germany | 16/235 |
| 3100138 | 8/1982 | Fed. Rep. of Germany | 16/243 |
| 3712216 | 10/1988 | Fed. Rep. of Germany | 296/76 |

*Primary Examiner*—Dennis H. Pedder
*Assistant Examiner*—Cathleen Pringle
*Attorney, Agent, or Firm*—William A. Schuetz

[57] ABSTRACT

The present invention relates to an adjustable hinge assembly for a vehicle closure or deck lid which can be readily, vertically adjusted to enable the closure or deck lid to be positioned so as to be flush with adjacent exterior body structure of the vehicle when in a closed position. The assembly includes a hinge box, a vertical slide which carries a hinge pivot, adjustment means for vertically raising and lowering the slide and cooperable guides on the slide and hinge box for guiding the movement of the slide in a vertical path.

5 Claims, 3 Drawing Sheets

ADJUSTABLE DECK LID HINGE PIVOT

The present invention relates to an adjustable hinge assembly and, more particularly, to an adjustable hinge assembly for a vehicle closure or deck lid which can be readily, vertically adjusted to enable the closure or deck lid to be positioned so as to be flush with adjacent quarter panels of the vehicle when in its closed position.

It is common to provide a pair of hinge assemblies for swingably mounting a closure, such as a deck or trunk lid to body structure of an automotive vehicle to enable the deck lid to be swingably moved between open and closed positions. These known hinge assemblies have included hinge boxes which are mounted to the vehicle body structure, such as an inner shelf panel, horizontally disposed hinge pins or pivots carried by the hinge boxes and straps having one end connected or mounted to the deck lid and their other ends pivotally connected to the hinge pins. In order for the deck lid to be properly aligned with the adjacent exterior body structure, including the rear quarters, it is common to provide an adjustment means to enable the deck lid to be adjusted side to side and fore and aft of the quarter panels. One way to achieve this adjustment is to provide oversize holes or slots in the inner panel of the deck lid or in the straps to enable the deck lid to be shifted somewhat relative to the straps prior to tightening down fasteners passing through holes in the strap and the inner panel of the deck lid. Heretofore, flushness between the exterior surface of the deck lid and rear quarter panels has been primarily achieved by vertically adjusting the position of the deck lid latch carried by the rear body structure of the vehicle and by adjusting the vertical position of the hinge boxes on the vehicle body support structure or inner shelf panel via vertical slots in the support or brackets of the hinge box and then clamping the same together via bolts. Flushness has also been achieved by providing the hinge box with vertical slots through which the hinge pivot extends and supporting the hinge pin via an eyebolt which can be vertically adjusted to raise and lower the deck lid, as evidenced by U.S. Pat. No. 4,893,863, assigned to the same assignee as the present invention.

The present invention provides a hinge assembly for a closure or deck lid of an automotive vehicle which has a novel adjustment means for readily, vertically positioning the deck lid so that it can be flush with the adjacent quarter panels of the vehicle and which does not require adjusting the position of the hinge box so that the latter can be preassembled or welded to the support structure prior to installation of the deck lid.

Accordingly, an important object of the present invention is to provide a new and improved hinge assembly for a closure or deck lid of an automotive vehicle which has a novel adjustment means for readily, vertically positioning the deck lid so that it can be flush with the adjacent quarter panels of the vehicle and which does not require adjusting the position of the hinge box so that the latter can be preassembled or welded to a support structure prior to installation of the deck lid.

Another object of the present invention is to provide a new and improved hinge assembly, as defined in the preceding object, and in which the hinge boxes have vertically extending slots in their sides through which a horizontally disposed hinge pin or pivot means extends and in which the adjustment means comprises a slide having a top and a pair of sides which overlie and straddle the hinge box and with the pivot means being secured to the sides of the slide, and an adjustable fastener means connected to the hinge box and slide for vertically raising and lowering the slide and pivot means relative to the hinge box so that the closure or deck lid can be raised and lowered at its end adjacent the hinge box to enable the same to be vertically adjusted so that its exterior sides will be flush with the adjacent vehicle body structure.

Yet another object of the present invention is to provide a new and improved hinge assembly, as defined in the next preceding object, and in which includes cooperable guide means on the slide and the hinge box for guiding the vertical movement of the slide relative to the hinge box.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which.

Figure 1:
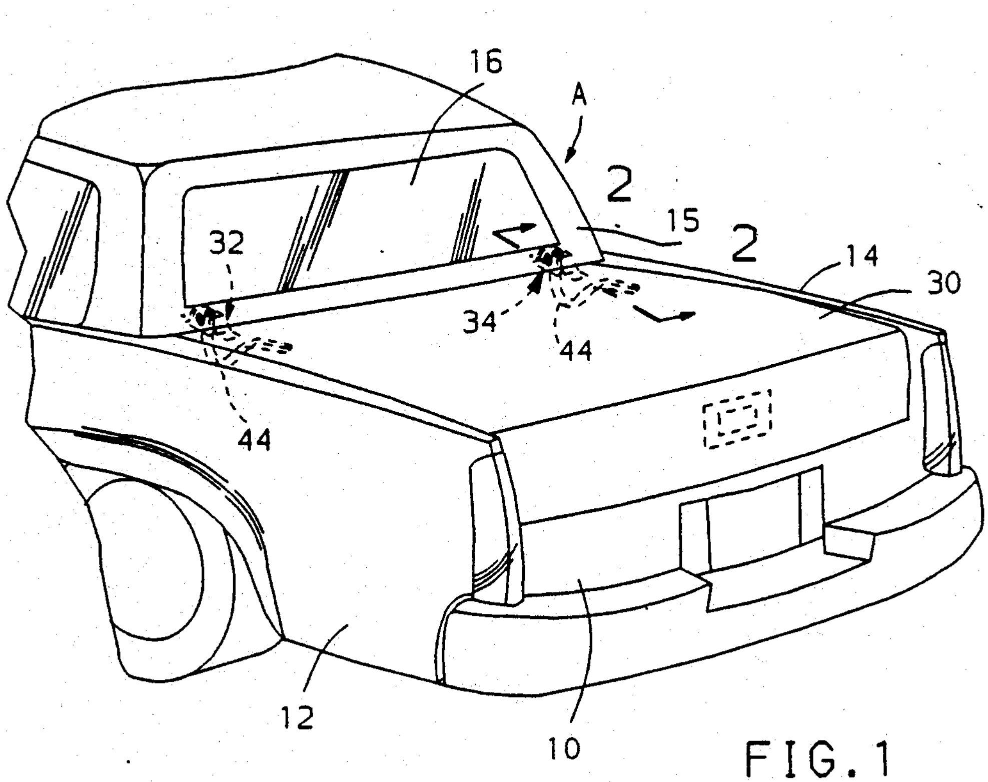
FIG. 1 is a fragmentary rear perspective view of a vehicle having a deck lid and incorporating the novel hinge assembly of the present invention.
Figure 2:
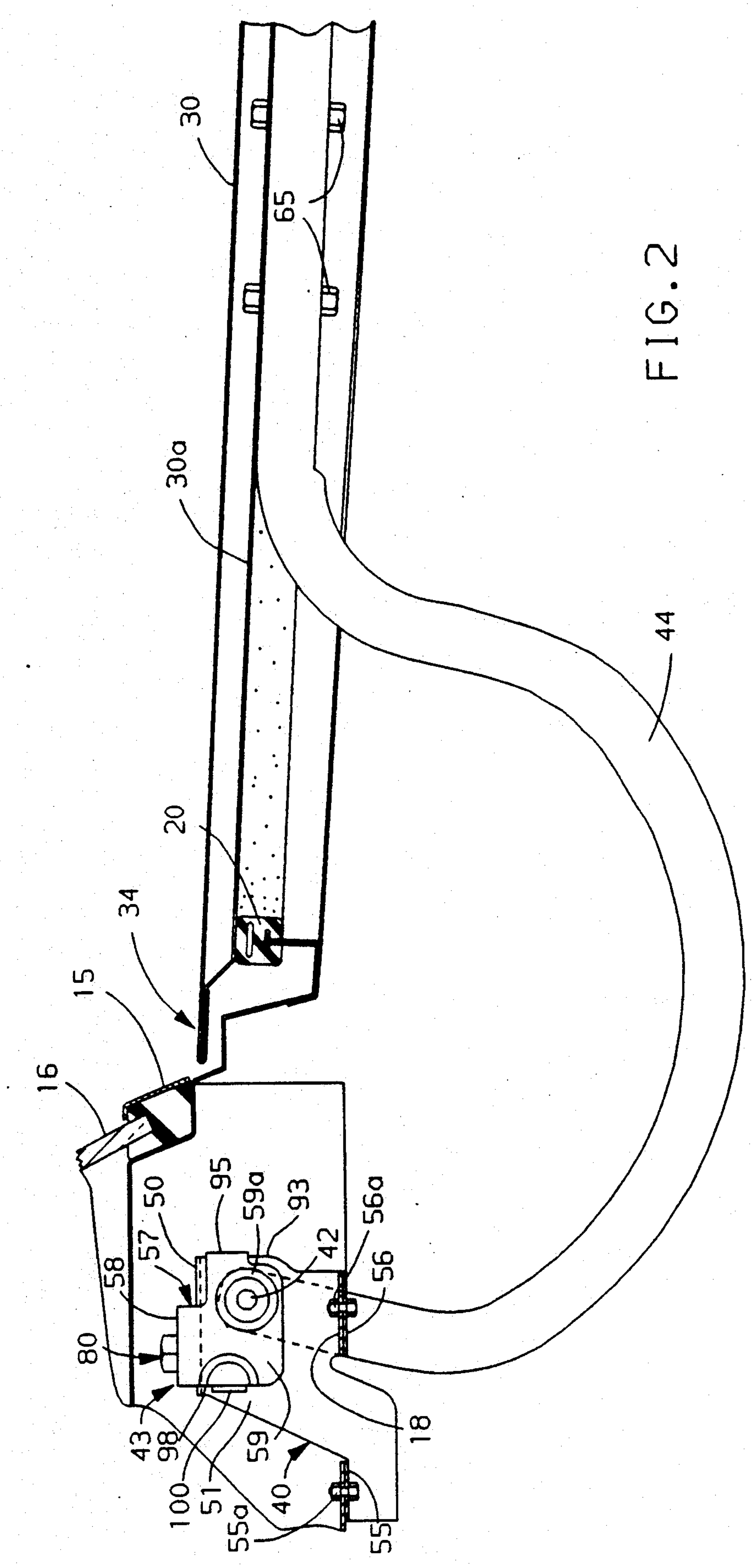
FIG. 2 is an enlarged fragmentary sectional view taken along the lines 2—2 of FIG. 1.

Referring to FIG. 1 of the drawings, an automotive vehicle. A is thereshown. The vehicle A has vehicle body structure including a rear 10 extending transversely of the vehicle, a pair of side rear quarter panels 12 and 14, transverse body structure 15 defining an opening for a rear window 16 and a transversely extending support or inner shelf panel 18 (see FIG. 2) downwardly adjacent from the rear window 16. The side rear quarter panels 12 and 14, the rear 10 and the transverse body structures 15 and 18 define a rear compartment or trunk opening and together at their upper ends carry a circumferentially extending seal 20 surrounding the trunk compartment. The vehicle A additionally includes a rear deck lid or trunk 30 which is swingably mounted to the inner shelf panel 18 via a pair of hinge assemblies 32, 34 for movement between a closed position, as shown in FIG. 1, in which the deck lid 30 closes off access to the rear compartment and engages the seal 20 and an open position (not shown) to provide access to the rear compartment. The rear deck lid 30 is adapted to be latched in its closed position, as shown in FIG. 1, via a suitable latch mechanism (not shown) when the deck lid 30 is moved to its closed position.

The hinge assemblies 32 and 34 are of an identical construction and hence only the hinge assembly 34 will be described in detail. The hinge assembly 34 comprises, in general, a hinge box 40, a hinge pin or pivot means 42, an adjustment means 43 for raising and lowering the pivot means 42, and a goose neck shaped hinge strap 44 having one end which is adapted to be bolted or secured to the underside of the deck lid 30 and its other end pivotally connected to the hinge pin 42.

Figure 3:
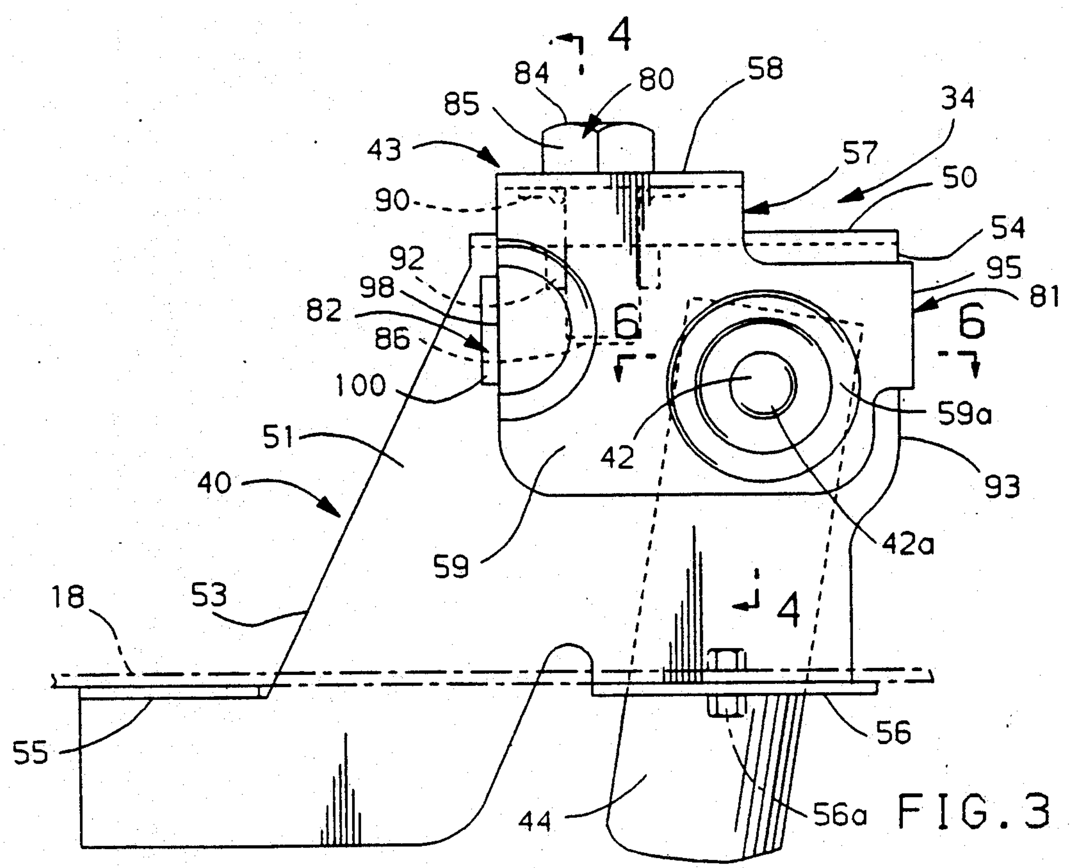
FIG. 3 is an enlarged fragmentary side elevational view of part of the hinge assembly shown in FIG. 2.
Figure 4:
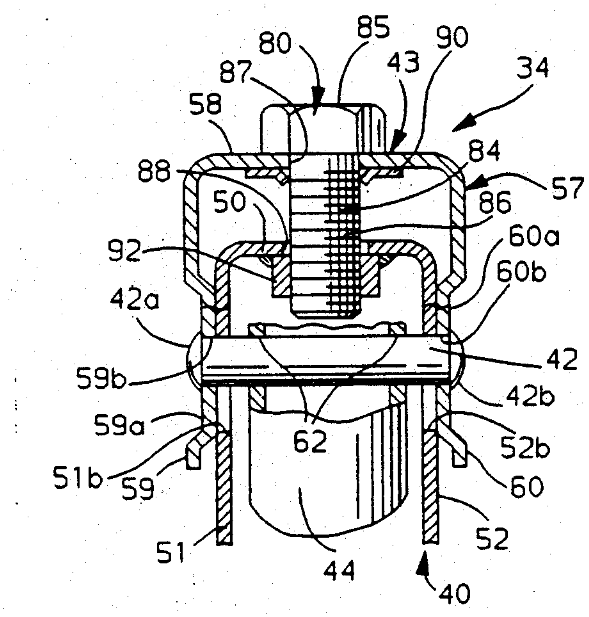
FIG. 4 is a fragmentary sectional view looking in the direction of the arrows 4—4 of FIG. 3.

As best shown in FIGS. 3 and 4, the hinge box 40 comprises a suitable sheet metal stamping, preferably made from steel, which is bent or shaped to the configuration shown in FIGS. 3 and 4. The hinge box comprises a top 50, a pair of vertically extending sides 51 and 52, an open front end 53 and an open rear end 54. The hinge box 40 is generally U-shaped in cross-section and the sides 51 and 52 of the hinge box 40 are provided with planar flanges 55 and 56 to enable the hinge box 40 to be welded or, as shown, be bolted to the inner shelf panel or support 18 of the vehicle A via bolts 55*a* and 56*a*, respectively.

The hinge box 40 supports a slide 57 of the adjustment means 43. The slide 57 is of an inverted U-shape and has a top 58 and a pair of sides 59, 60 which overlie and straddle the hinge box 40. Further, the sides 59 and 60 of the slide 57 are provided with generally circular shaped depressions 59*a* and 60*a* whose inner surfaces slidably engage the outer surfaces of the sides 51 and 52 of the hinge box 40, respectively.

The hinge box 40 supports the hinge strap 44 via the hinge pivot or pivot means 42. The hinge pin 42 comprises a circular rivet-like member. The hinge pin 42 freely extends through aligned openings 52*b* and 51*b* in the sides 52 and 51 of the hinge box 40 and extends through openings 59*b* and 60*b* in the depressions 59*a* and 60*a* in the sides 59 and 60 of the slide 57, respectively. The hinge pin rivet is peened over at its ends to form heads 42*a* and 42*b* which respectively engage the sides 59 and 60 of the slide 57 to secure the rivet pin 42 to the slide 57. Alternately, the hinge pin 42 could be a bolt which is threaded at one end to receive a lock nut. The hinge strap 44 is hereshown as being tubular and, at its inner end, has a pair of aligned openings 62 through which the hinge pin 42 extends.

The hinge strap at its rear end 44 is partially flattened (see FIG. 2) and is adapted to be suitably bolted to an inner panel 30*a* of the deck lid 30 via a suitable bolt or fastener 65. As is conventional in the art, the inner panel 30*a* of the deck lid 30 would be provided with either oversize or slotted openings not shown to enable the deck lid 30 to be slightly adjusted side to side between the rear quarter panels 12 and 14 and fore and aft of the rear quarter panels 12 and 14 for proper alignment purposes prior to the fastener 65 being tightened down to secure the deck lid 30 to the hinge strap 44. In addition, as is conventional in the art, the deck lid latch mechanism (not shown) at the rear end 10 of the vehicle would be vertically adjustable to position the rear end of the deck lid 30 vertically vis-a-vis the quarter panels 12 and 14 so as to effect proper alignment and flushness therewith. Since these adjustments are conventional in the art, they have not been shown in detail in the drawings and will not be described in detail.

In accordance with the provisions of the present invention, a novel adjustment means 43 is provided to enable the deck lid 30 at its end adjacent the rear window 16 to be readily vertically positioned as to be flush with the adjacent exterior surface of the vehicle, i.e., the rear quarter panels 12 and 14. To this end, the openings 51*b* and 52*b* in the sides 51 and 52 of the hinge box 40 are in the form of vertically extending slots instead of just being circular openings. The adjustment means further includes the previously described slide 57, an adjustable fastener means 80 and cooperably engageable means 81 and 82 (see FIG. 6) for vertically guiding the movement of the slide 57 upon the latter being raised or lowered by the fastener means 80.

The adjustable fastener means 80 comprises a bolt 84 having a tool engaging head 85, preferably a hex head, and a threaded shank 86. The head 85 has its underside in engagement with the top surface of the top 58 of the slide 57 and the shank 86 extends through aligned openings 87 and 88 in the top 58 of the slide 57 and the top 50 of the hinge box 40, respectively. The bolt 84 is rotatable relative to the slide 57 but is retained against axial displacement relative to the slide by a retainer 90, preferably a push nut retainer, which surrounds the shank and engages the underside of the top 58 of the slide 57. The retainer 90 prevents upward displacement of the bolt 84 relative to the slide 57 but permits rotation of the bolt 84. The fastener means 80 also includes a threaded nut 92 which is welded to the underside of the top 50 of the hinge box and which threadably receives the threaded shank 86 of the bolt 84. Alternately, and if sufficient space exists between the top 50 of the hinge box 40 and the top 58 of the slide 57, the retainer 90 could be replaced by a compression spring.

Figure 5:
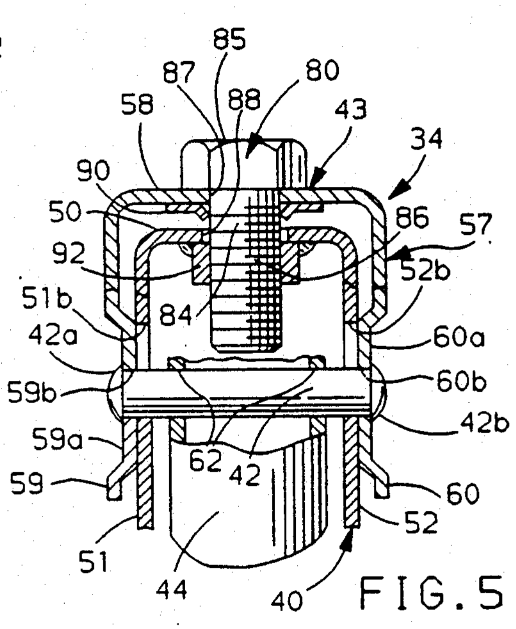
FIG. 5 is a fragmentary sectional view, like that shown in FIG. 4, but showing different parts thereof in different positions.

From the foregoing, it should be apparent that the hinge pin 42 can be raised or lowered by simply rotating the bolt 84, which in turn carries the slide 57 to vertically move relative to the hinge box 40 and the pivot pin 42 to slide within the vertically slotted opening 51*b* and 52*b*. Rotation of the bolt 84 in one direction will cause the head 85 of the bolt 84 to be moved upwardly due to its threaded engagement with the stationary nut 92, which in turn causes the push nut retainer 90 to move the slide 57 upwardly. Reverse rotation of the head 85 of the bolt 84 causes a lowering of the slide and pivot pin 42. FIGS. 4 and 5 show the maximum raised and lowered positions of the slide 57 and hinge pivot 42, respectively.

Figure 6:
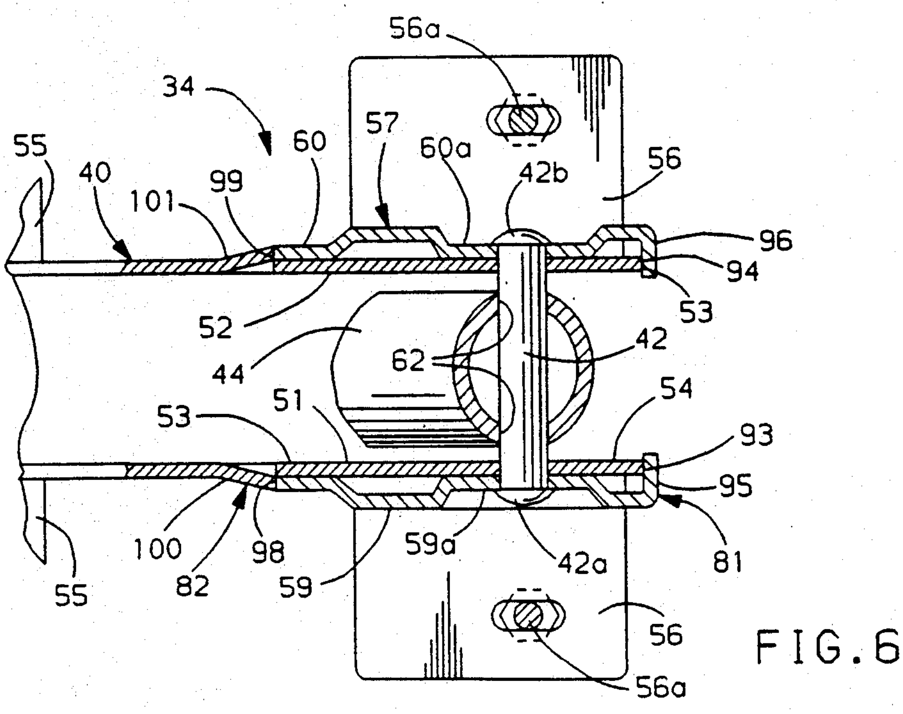
FIG. 6 is a fragmentary sectional view taken along lines 6—6 of FIG. 3 but with the shelf panel deleted.

As best shown in FIG. 6, the cooperably engageable means 81 and 82 maintain the vertical attitude of the slide 57 and guide the movement of the slide 57 when it is raised or lowered. The means 81 comprises providing vertical end surfaces 93 and 94 along the sides 51 and 52 of the hinge box 40 which face rearwardly of the vehicle and providing inturned vertically extending flanges 95 and 96 at the sides 59 and 60 of the slide 57 which face toward each other and which slidably engage the end surfaces 93 and 94 of the sides 51 and 52 of the hinge box 40. The cooperably engageable means 82 comprises providing vertically disposed end surfaces 98, 99 at the sides 59 and 60 of the slide 57 which face forwardly of the vehicle and lanced tabs 100, 101 extending outwardly from the sides 51 and 52 of the hinge box 40 which engage the end surfaces 98, 99, respectively. The cooperably engageable means 81 and 82 insure that the slide can only be moved vertically relative to the hinge box 40.

During assembly of the rear deck lid 30 to the vehicle A, the vertical position adjacent the rear window 16 of the deck lid 30 can be readily adjusted by suitably rotating the head 85 of the bolt 84. This enables the axis of the hinge pin 42 to be readily vertically adjusted until the deck lid 30 is flush with the adjacent quarter panels 12 and 14 of the vehicle.

An important advantage of the above-noted vertical adjustment means 43 for the rear deck lid 30 of the vehicle A is that the hinge box 40 can be preassembled in place on the inner shelf panel 18 and thereafter the deck lid 30 adjacent its end near the rear window 16 can be readily adjusted vertically by merely rotating the head 85 of the bolt 84. In addition, it should be apparent that the ready adjustment means 43 is of a very simple and economical construction.

Although the illustrated embodiment thereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. In an automotive vehicle having body structure including spaced side quarter panels and spaced supports extending transversely to said quarter panels which together define a compartment having a top opening, a closure, a pair of spaced hinge assemblies for swingably supporting said closure for movement between an open position to permit access to said compartment and a closed position in which said closure covers said compartment, each of said hinge assemblies comprising a hinge box having spaced vertical sides and top and with the hinge box being mounted to one of said transverse supports, a generally horizontal pivot means extending through aligned openings in the sides of said hinge box, a hinge strap having one end mounted to said closure and its other end pivotally connected to said pivot means, and adjustment means for vertically raising and lowering the pivot means and hence the closure so that its exterior surface will be flush with adjacent exterior body structure of the vehicle, the improvement being that the adjustment means for raising and lowering said closure comprises providing vertically extending slots in the sides of said hinge box, a slide having spaced sides and a top and which overlies and straddles said hinge box, said sides of said slide being slidable relative tot he sides of said hinge box, said pivot means being secured to the sides of said slide and extending through said vertical slots, adjustable fastener means connected with said slide and said hinge box for vertically raising and lowering said slide and pivot means relative to said hinge box so that said closure can be raised and lowered at its end adjacent the hinge box to enable the closure to be vertically adjusted so that its exterior sides will be flush with the adjacent vehicle body structure, and cooperably engageable means on said slide and hinge box for guiding the movement of said slide relative to the hinge box so that said slide can only be moved in a vertical path.

2. In an automotive vehicle having body structure including spaced rear side quarter panels and spaced supports extending transversely to said quarter panels which together define a trunk compartment having a top opening, a deck lid, a pair of spaced hinge assemblies for swingably supporting said deck lid for movement between an open position to permit access to said compartment and a closed position in which said deck lid covers said compartment, each of said hinge assemblies comprising a hinge box having spaced vertical sides and a top and with the hinge box being mounted to one of said transverse supports, a hinge pivot extending through aligned openings in the sides of said hinge box, a hinge strap having one end mounted to said deck lid and its other end pivotally connected to said hinge pivot, and adjustment means for vertically raising and lowering the deck lid so that its exterior surface will be flush with adjacent exterior surfaces of the quarter panels of said vehicle, the improvement being that the adjustment means for raising and lowering said deck lid so that when the deck lid is in its closed positions its exterior surface will be flush with the adjacent exterior surfaces of the quarter panels of the vehicle comprises providing vertically extending slots in the sides of said hinge box, an inverted U-shaped slide having spaced sides and a top which overlie and straddle said hinge box, said sides of said slide being slidable relative to said sides of said hinge box, said pivot means being secured to the sides of said slide and extending through said vertical slots in the sides of said hinge box, adjustable fastener means connected with said slide and said hinge box for vertically raising and lowering said slide and pivot means relative to said hinge box so that the deck lid can be raised and lowered at its end adjacent the hinge box to enable the deck lid to be vertically adjusted so that its exterior surface will be flush with the adjacent vehicle body structure, and cooperably engageable guide means on said sides of said slide and hinge box for guiding the movement of said slide relative to said hinge box so that the slide can only be moved in a vertical path.

3. In an automotive vehicle having body structure including spaced rear side quarter panels and spaced supports extending transversely to said quarter panels which together define a trunk compartment having a top opening, a deck lid, a pair of spaced hinge assemblies for swingably supporting said deck lid for movement between an open position to permit access to said compartment and a closed position in which said deck lid covers said compartment, each of said hinge assemblies comprising a hinge box having spaced vertical sides and a top and with the hinge box being mounted to one of said transverse supports, a hinge pivot extending through aligned openings in the sides of said hinge box, a hinge strap having one end mounted to said deck lid and its other end pivotally connected to said hinge pivot, and adjustment means for vertically raising and lowering the deck lid so that its exterior surface will be flush with adjacent exterior surfaces of the quarter panels of said vehicle, the improvement being that the adjustment means for raising and lowering said deck lid so that when the deck lid is in its closed positions its exterior surface will be flush with the adjacent exterior surfaces of the quarter panels of the vehicle comprises providing vertically extending slots in the sides of said hinge box, an inverted U-shaped slide having spaced sides and a top which overlie and straddle said hinge box, said sides of said slide being slidable relative to said sides of said hinge box, said pivot means being secured to the sides of said slide and extending through said vertical slots in the sides of said hinge box, adjustable fastener means connected with said slide and said hinge box for vertically raising and lowering said slide and pivot means relative to said hinge box so that the deck lid can be raised and lowered at its end adjacent the hinge box to enable the deck lid to be vertically adjusted so that its exterior surface will be flush with the adjacent vehicle body structure, and cooperably engageable guide means on said slide and hinge box for guiding the movement of said slide relative to said hinge box so that the slide can only be moved in a vertical path, said cooperably engageable guide means comprising a pair of end flanges which face each other and extend transversely of the sides of said slide at one end thereof, said flanges overlying adjacent vertically disposed end surfaces of said sides of said hinge box, and wherein said slide has vertically extending end surfaces at its end remote from said end flanges which slidably engage end surfaces of tabs lanced outwardly from the sides of said hinge box.

4. In an automotive vehicle, as defined in claim 2, and wherein said adjustable fastener means comprises a bolt having a head and a threaded shank which extends through aligned apertures in the top of said slide and said hinge box and with the head engaging the top of said slide at it exterior side, a nut fixed to said top of said hinge box at its interior side and which is threadably engaged with said threaded shank and a retainer which engages the top of said slide at its interior side and which surrounds the shank of the bolt, said retainer maintaining the top of said slide in engagement with the head of said bolt, but allowing said bolt to be rotated while maintaining said top of said slide in engagement with the head of said bolt.

5. In an automotive vehicle, as defined in claim 3, and wherein said adjustable fastener means comprises a bolt having a head and a threaded shank which extends through aligned apertures in the top of said slide and said hinge box and with the head engaging the top of said slide at it exterior side, a nut fixed to said top of said hinge box at its interior side and which is threadably engaged with said threaded shank and a retainer which engages the top of said slide at its interior side and which surrounds the shank of the bolt, said retainer maintaining the top of said slide in engagement with the head of said bolt, but allowing said bolt to be rotated while maintaining said top of said slide in engagement with the head of said bolt.

* * * * *